US010234867B2

(12) United States Patent
Kawabata

(10) Patent No.: US 10,234,867 B2
(45) Date of Patent: Mar. 19, 2019

(54) INFORMATION PROCESSING DEVICE, VEHICLE-MOUNTED DEVICE, AND INFORMATION PROCESSING METHOD

(71) Applicant: Kabushiki Kaisha Toshiba, Minato-ku (JP)

(72) Inventor: Takeshi Kawabata, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 174 days.

(21) Appl. No.: 15/437,576

(22) Filed: Feb. 21, 2017

(65) Prior Publication Data
US 2017/0269606 A1    Sep. 21, 2017

(30) Foreign Application Priority Data

Mar. 17, 2016 (JP) ................... 2016-054527

(51) Int. Cl.
*G05D 1/02* (2006.01)
*G07C 5/00* (2006.01)
(Continued)

(52) U.S. Cl.
CPC ....... *G05D 1/0276* (2013.01); *B60K 31/0058* (2013.01); *G07C 5/008* (2013.01);
(Continued)

(58) Field of Classification Search
CPC ................. G05D 1/0276; G08G 1/161; G08G 1/096716; G08G 1/017; G08G 1/0141;
(Continued)

(56) References Cited

U.S. PATENT DOCUMENTS 7,167,780 B2 *  1/2007  Hattori ................... B60R 25/24
                                                    307/10.6
7,805,242 B2 *  9/2010  Fujimoto .................. B60T 7/22
                                                      701/36
(Continued)

FOREIGN PATENT DOCUMENTS

JP    2009-181472    8/2009
JP    2011-138317    7/2011
(Continued)

*Primary Examiner* — Russell Frejd
(74) *Attorney, Agent, or Firm* — Oblon, McClelland, Maier & Neustadt, L.L.P.

(57) ABSTRACT

According to an embodiment, an information processing device is communicably connected to a vehicle-mounted device and includes a receiver, a calculator, a vehicle database, and a transmitter. The receiver receives transmission information transmitted from the vehicle-mounted device and containing vehicle identification information, vehicle position information, a flag for indicating presence or absence of alternation of the vehicle-mounted device, and predetermined log data recorded by the vehicle-mounted device. The calculator calculates, based on the received transmission information, a degree of reliability of vehicle having the vehicle-mounted device mounted therein. The vehicle database holds, for each vehicle, the calculated degree of reliability and the vehicle position information. The transmitter refers to the vehicle database to identify a surrounding vehicle of a target vehicle, and transmits, to the vehicle-mounted device of the target vehicle, vehicle reception information containing the degree of reliability calculated for the surrounding vehicle.

15 Claims, 7 Drawing Sheets

(51) Int. Cl.
 *G08G 1/01* (2006.01)
 *G08G 1/16* (2006.01)
 *B60K 31/00* (2006.01)
 *G08G 1/017* (2006.01)
 *G08G 1/0965* (2006.01)
 *G08G 1/0967* (2006.01)

(52) U.S. Cl.
 CPC ........... *G08G 1/017* (2013.01); *G08G 1/0112* (2013.01); *G08G 1/0129* (2013.01); *G08G 1/0141* (2013.01); *G08G 1/0965* (2013.01); *G08G 1/096716* (2013.01); *G08G 1/096741* (2013.01); *G08G 1/096775* (2013.01); *G08G 1/161* (2013.01)

(58) Field of Classification Search
 CPC ........... G08G 1/096741; G08G 1/0965; G08G 1/0112; G08G 1/096775; G08G 1/0129; B60K 31/0058; G07C 5/008
 See application file for complete search history.

(56) References Cited

U.S. PATENT DOCUMENTS

| | | | |
|---|---|---|---|
| 8,494,709 B2 * | 7/2013 | Hamada | G08G 1/163 340/435 |
| 8,593,909 B2 * | 11/2013 | Steiner | G01S 3/8083 367/118 |
| 9,104,535 B1 | 8/2015 | Brinkmann et al. | |
| 2007/0032929 A1 | 2/2007 | Yoshioka et al. | |
| 2011/0210867 A1 | 9/2011 | Benedikt | |
| 2012/0283944 A1 | 11/2012 | Haavasoja | |
| 2014/0191858 A1 | 7/2014 | Morgan et al. | |
| 2014/0207357 A1 * | 7/2014 | Shimotani | G08G 1/096725 701/93 |
| 2015/0127191 A1 | 5/2015 | Misra et al. | |
| 2016/0042644 A1 | 2/2016 | Velusamy | |

FOREIGN PATENT DOCUMENTS

| | | |
|---|---|---|
| JP | 2015-106242 | 6/2015 |
| JP | 2015-153208 | 8/2015 |
| JP | 5766074 | 8/2015 |

* cited by examiner

FIG.3

| VEHICLE ID | POSITION INFORMATION | REGULAR FLAG (1/0) | DEVICE INFORMATION (WHEN REGULAR FLAG IS SET TO 0) | DEVICE SETTING INFORMATION | LOG DATA | | |
|---|---|---|---|---|---|---|---|
| | | | | | RELATIVE VELOCITY FLUCTUATION DATA | DISTANCE FLUCTUATION DATA | SUDDEN BRAKE FREQUENCY DATA |

Tx

| VEHICLE ID | REGULAR FLAG | OEM NAME | RECOGNITION LSI | DETERMINATION LSI | CONTROL LSI | DEGREE OF RELIABILITY | POSITION INFORMATION |
|---|---|---|---|---|---|---|---|
| 0001 | 1 | COMPANY A | aa | aaa | aaaa | 100 | ( , ) |
| 0002 | 0 | COMPANY A | xx | aaa | aaaa | 40 | ( , ) |
| 0003 | 1 | COMPANY B | bb | bbb | bbbb | 90 | ( , ) |
| 0004 | 0 | COMPANY B | bb | yyy | bbbb | 90 | ( , ) |
| ⋮ | ⋮ | ⋮ | ⋮ | ⋮ | ⋮ | ⋮ | ⋮ |

INFORMATION PROCESSING DEVICE, VEHICLE-MOUNTED DEVICE, AND INFORMATION PROCESSING METHOD

CROSS-REFERENCE TO RELATED APPLICATIONS

This application is based upon and claims the benefit of priority from Japanese Patent Application No. 2016-054527, filed on Mar. 17, 2016; the entire contents of which are incorporated herein by reference.

FIELD

An Embodiment described herein relates generally to an information processing device, a vehicle-mounted device, and an information processing method.

BACKGROUND

In recent years, in vehicles such as automobiles, the technology development of the advanced driving assistant system (ADAS) or automated driving is being actively pursued, and the subject of driving is about to change from a person to a machine. The driving control technology such as the ADAS or automated driving can be mainly classified into three functions, namely, a recognition function, a determination function, and a control function. The recognition function enables recognition of the state of the vehicle based on a variety of sensing information obtained by an accelerator sensor, a vehicle velocity sensor, a GPS sensor, a vehicle-mounted camera, and a lidar apparatus. The determination function enables determination of the necessary vehicle control based on the recognition result obtained by the recognition function and based on the current control status. The control function enables controlling the vehicle based on the determination result obtained by the determination function.

The recognition function, the determination function, and the control function of the ADAS or automated driving are implemented using a vehicle-mounted device (a vehicle-mounted system) mounted in the vehicle. However, the sensors or the LSI circuits used in the vehicle-mounted device not only differ among the vehicle vendors but also differ among the vehicle types. Hence, the capability of each function differs for each vehicle type. For example, when the brake performance of a vehicle type A is different from the brake performance of a vehicle type B, then the control timings differ due to different braking distances. Moreover, even in the same vehicle type, if the vehicle-mounted device is altered, the performance thereof also differs. Moreover, depending on the skills of the driver and the surrounding environment, the control stability also happens to change.

The information related to the vehicle performance or the control stability can be useful in implementing appropriate vehicle control using the ADAS or automated driving. Particularly, the information related to the surrounding vehicles that are running around (in the vicinity of) the concerned vehicle serves as important information. For example, when a low-performance vehicle or a vehicle having unstable behavior (control) is present in front of the concerned vehicle, it becomes possible to perform control such as expediting the braking timing. For that reason, there is a demand for a mechanism for reflecting the performance of the surrounding vehicles and the control stability (in the following explanation, the concept including those points is called "degree of reliability") in the vehicle control.

BRIEF DESCRIPTION OF THE DRAWINGS

FIG. 3 is a diagram illustrating an example of transmission information;

DETAILED DESCRIPTION

Figure 1:
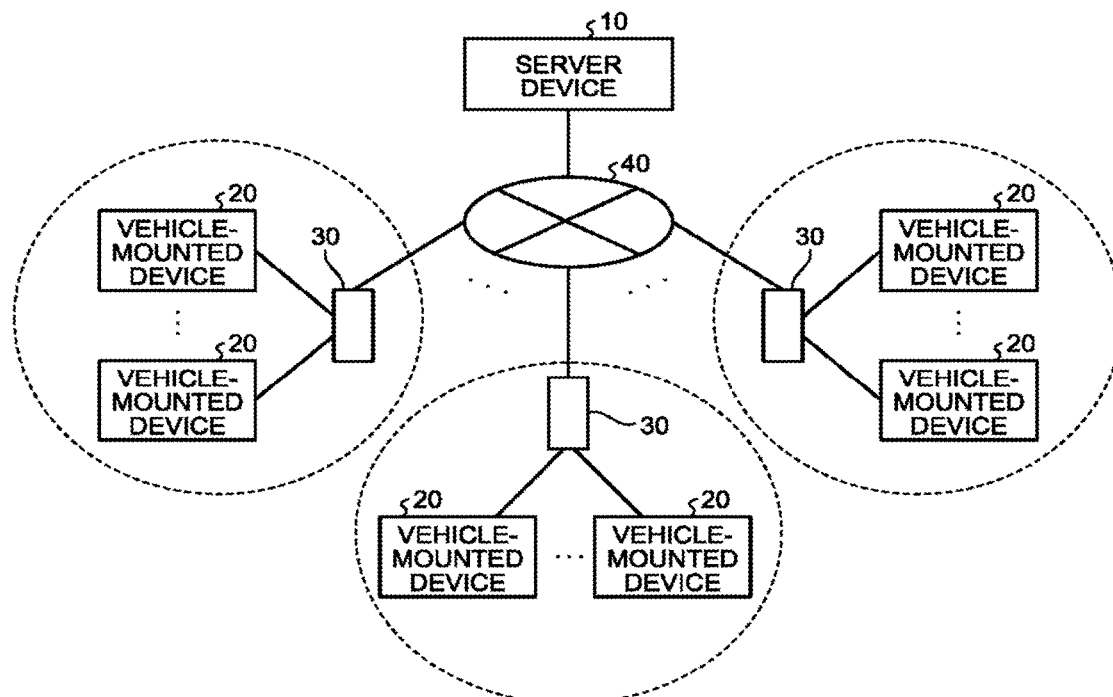
FIG. 1 is a diagram illustrating an overall configuration of an information providing system.

According to an embodiment, an information processing device is communicably connected to a vehicle-mounted device and includes a receiver, a calculator, a vehicle database, and a transmitter. The receiver receives transmission information which is transmitted from the vehicle-mounted device and contains at least vehicle identification information, vehicle position information, a flag for indicating presence or absence of alternation of the vehicle-mounted device, and predetermined log data recorded by the vehicle-mounted device. The calculator calculates, based on the received transmission information, a degree of reliability of vehicle in which the vehicle-mounted device is mounted. The vehicle database holds, for each vehicle, at least the calculated degree of reliability and the vehicle position information. The transmitter refers to the vehicle database to identify a surrounding vehicle of a target vehicle which satisfies a predetermined condition, and transmits, to the vehicle-mounted device of the target vehicle, vehicle reception information containing the degree of reliability calculated for the surrounding vehicle.

An embodiment is described below with reference to the accompanying drawings.

An information processing device according to the embodiment can be implemented, for example, as a server device in a network (cloud). The server device is communicably connected to a number of vehicle-mounted devices via the network and, based on transmission information Tx that is transmitted from each vehicle-mounted device Tx, calculates the degree of reliability indicating the vehicle performance and the control stability of the vehicle in which the vehicle-mounted device is mounted. Then, the server device holds the calculated degrees of reliability along with position information of the vehicles in a database. Moreover, the server device refers to the database to identify the surrounding vehicles of the target vehicle satisfying a predetermined condition (for example, the vehicle that has transmitted the transmission information Tx), and transmits vehicle reception information Rx containing the degrees of reliability of the surrounding vehicles in a receivable manner for the vehicle-mounted device of the target vehicle.

For example, consider a case in which vehicles A, B, and C are running close to each other. The server device calculates the degree of reliability of the vehicle A based on the transmission information Tx transmitted from the vehicle-mounted device of the vehicle A; calculates the degree of reliability of the vehicle B based on the transmission information Tx transmitted from the vehicle-mounted device of the vehicle B; and calculates the degree of reliability of the vehicle C based on the transmission information Tx transmitted from the vehicle-mounted device of the vehicle C. Then, the server device transmits, to the vehicle-mounted device of the vehicle A, the vehicle reception information Rx containing the degrees of reliability of the vehicles B and C; transmits, to the vehicle-mounted device of the vehicle B, the vehicle reception information Rx containing the degrees of reliability of the vehicles A and C; and transmits, to the vehicle-mounted device of the vehicle C, the vehicle reception information Rx containing the degrees of reliability of the vehicles A and B.

A vehicle-mounted device is a vehicle-mounted system including various sensors, various LSI circuits (electronic circuit units: ECUs), various actuators, and software that is to be executed in the processors of the LSIs (computer hardware) for the purpose of implementing the recognition function/the determination function/the control function of the ADAS and automated driving. The vehicle-mounted device receives the vehicle reception information Rx containing the degrees of reliability of the surrounding vehicles; and, for example, in the case of providing the driving support using the ADAS, can notify the user about the surrounding vehicles having low degrees of reliability with the use of a display or an alert function so as to draw the attention of the user to those vehicles. Moreover, in the case of performing automated driving, it becomes possible to perform safer vehicle control in which determination is done by taking into account the degrees of reliability of the surrounding vehicles.

The vehicle-mounted device can be configured such that whether or not to receive the vehicle reception information Rx, which contains the degrees of reliability of the surrounding vehicles, is switched according to a predetermined operation. For example, an ON/OFF button for communication control can be provided and, while the ON/OFF button is switched ON, the corresponding vehicle-mounted device transmits the transmission information Tx according to predetermined rules. Based on the position information that is specified in the transmission information Tx transmitted from a vehicle-mounted device, the server device identifies the surrounding vehicles of the vehicle in which the vehicle-mounted device is mounted, and transmits the vehicle reception information Rx in a receivable manner for the vehicle-mounted device that transmitted the transmission information Tx.

As an example, the communication between the server device and a vehicle-mounted device can be performed using the ITS spot service that is becoming popular as one of the services of the intelligent transport system (ITS). The ITS spot service is a service in which ITS spots (roadside apparatuses) that are installed on the roadside perform high-speed and high-capacity two-way communication with the vehicle-mounted device so that a variety of information is provided to the vehicle-mounted device. The vehicle device can transmit the transmission information Tx to the server device present in the network. Moreover, the server device can transmit the vehicle reception information Rx, which contains the degrees of reliability of the surrounding vehicles, to the vehicle-mounted device.

In the following explanation, the embodiment is described in detail based on the premise of an information providing system in which the ITS spot service is used. Meanwhile, the configuration explained below is only exemplary and is not the only possible configuration. In the configuration according to the embodiment, as long as a server device 10 and a vehicle-mounted device 20 are communicably connected to each other, as long as the vehicle-mounted device 20 can transmit the transmission information Tx to the server device 10, and as long as the vehicle-mounted device 20 can receive the vehicle reception information Rx containing the degrees of reliability of the surrounding vehicles as calculated by the server device 10; it serves the purpose.

FIG. 1 is a diagram illustrating an overall configuration of the information providing system that includes the information processing device (the server device 10) and the vehicle-mounted device 20 according to the embodiment. As illustrated in FIG. 1, in this information providing system, the server device 10 installed in a network 40 is communicably connected with a number of vehicle-mounted devices 20 via the ITS spots 30. Herein, each ITS spot 30 performs two-way communication with the vehicle-mounted device 20 of each vehicle running within the communicable range of that ITS spot 30 (i.e., the range illustrated by a dashed line in FIG. 1). In the embodiment, with respect to a vehicle running within the communicable range of a single ITS spot 30, any other vehicle running in the same communicable range is treated as a surrounding vehicle.

Figure 2:
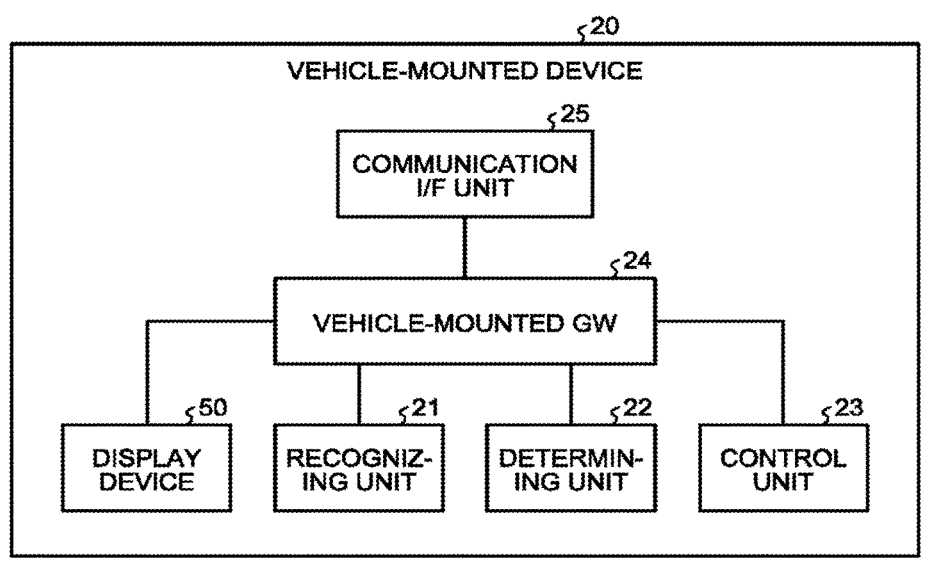
FIG. 2 is a block diagram illustrating an exemplary configuration of a vehicle-mounted device.

FIG. 2 is a block diagram illustrating an exemplary configuration of the vehicle-mounted device 20. As illustrated in FIG. 2, the vehicle-mounted device 20 includes a recognizing unit 21 for implementing the recognition function, a determining unit 22 for implementing the determination function, and a control unit 23 for implementing the control function. The recognizing unit 21, the determining unit 22, and the control unit 23 are constituent elements classified according to functions; and, in practice, include a variety of hardware (various sensors, various LSI circuits, and various actuators) and software.

Moreover, the vehicle-mounted device 20 includes a display device 50 that displays navigation information and a variety of information provided by the ITS spot service. In the embodiment, as part of the ADAS, it is assumed that the display device 50 displays a screen based on the degrees of reliability of the surrounding vehicles and supports the driving of the driver. In the case of performing automated driving, in addition to having a screen displayed by the display device 50, the determining unit 22 performs determination by taking into account the degrees of reliability of the surrounding vehicles, and reflects the degrees of reliability of the surrounding vehicles in the vehicle control performed by the control unit 23. Meanwhile, a specific example of the screen displayed on the display device 50 is described later in detail.

As an example, the recognizing unit 21, the determining unit 22, the control unit 23, and the display device 50 are connected to a vehicle-mounted gateway (GW) 24. Moreover, a communication I/F unit 25 is also connected to the vehicle-mounted GW 24. The communication I/F unit 25 is a communication interface for enabling the vehicle-mounted device 20 to perform communication with the outside of the vehicle. Examples of the communication I/F unit 25 include a dedicated transceiving chip for performing road-to-vehicle communication using radio transmission of the 802.11p standard; and a transceiving chip for performing communication either using a mobile communication network such as 3GPP (which stands for 3rd Generation Partnership Project (registered trademark)) or LTE (which stands for Long Term Evolution (registered trademark)) or using radio transmission of Wi-Fi (registered trademark) or Bluetooth (registered trademark).

In the vehicle-mounted device 20 according to the embodiment, the vehicle-mounted GW 24 has the following functions: the function of transferring data to the constituent elements connected thereto; the function of recording predetermined log data; the function of monitoring the alterations done to the vehicle-mounted device 20; and the function of obtaining, from a device modified due to alteration, device information for the purpose of identifying the type of that device.

Moreover, in the vehicle-mounted device 20 according to the embodiment, the communication I/F unit 25 has the following functions: the function (as a transmitter) of transmitting the transmission information Tx to the server device 10 in the network 40 via the ITS spot 30; and the function (as a receiver) of receiving the vehicle reception information Rx, which is transmitted by the server device 10, via the ITS spot 30.

FIG. 3 is a diagram illustrating an example of the transmission information Tx that is transmitted by the vehicle-mounted device 20 to the server device 10. For example, as illustrated in FIG. 3, the transmission information Tx transmitted by the vehicle-mounted device 20 contains a vehicle ID, position information, a regular flag, device information, device setting information, and log data.

The vehicle ID represents vehicle identification information that is uniquely assigned to a vehicle. In the embodiment, each vehicle is assigned with a vehicle ID in advance, and the vehicle-mounted device 20 is assumed to store the vehicle ID of the corresponding vehicle. Moreover, in the server device 10, the vehicle ID of each vehicle is assumed to be associated with the vehicle type.

The position information represents information indicating the current position of the vehicle as obtained using a GPS sensor, for example.

The regular flag is a flag indicating whether or not the vehicle-mounted device 20 is altered. Herein, the vehicle-mounted GW 24 detects whether or not the vehicle-mounted device 20 is altered, as described earlier. If the vehicle-mounted device 20 is not altered, the regular flag is set to "1". When the vehicle-mounted device 20 is altered, the regular flag is set to "0".

When the regular flag is set to "0", that is, when the vehicle-mounted device 20 has been altered; the device information is included in the transmission information Tx and represents information (such as the LSI model number) enabling identification of the type of the device modified due to alteration.

The device setting information represents information indicating the ON/OFF state of each function of the vehicle-mounted device 20. For example, when the vehicle-mounted device 20 is equipped with a brake assisting function or an automatic tracking function, the device setting information represents the information indicating the ON/OFF state of the brake assisting function or the ON/OFF state of the automatic tracking function.

The log data represents predetermined log data indicating the behavior of the vehicle as recorded by the vehicle-mounted GW 24 of the vehicle-mounted device 20. In the embodiment, the log data contains at least one of relative velocity fluctuation data, distance fluctuation data, and sudden brake frequency data.

The relative velocity fluctuation data indicates the time variation in the relative velocity with respect to another vehicle. For example, the relative velocity with respect to another vehicle (for example, the vehicle in front) can be calculated at regular intervals (such as 10 seconds) using a vehicle-mounted camera or a lidar apparatus and can be recorded as a log, and the temporal sequence of the relative velocities recorded within the transmission period of the transmission information Tx (i.e., during the period of time from the last transmission to the current transmission) can be set as the relative velocity fluctuation data. Alternatively, the dispersion of the relative velocities, which are recorded within the transmission period of the transmission information Tx, can be obtained and set as the relative velocity fluctuation data.

The distance fluctuation data indicates the time variation of the distance from another vehicle or a lane mark. For example, the distance from another vehicle (for example, the vehicle in front) or a lane mark can be measured at regular intervals (such as 10 seconds) using a vehicle-mounted camera or a lidar apparatus and recorded as a log, and the temporal sequence of distances recorded within the transmission period of the transmission information Tx can be set as the distance fluctuation data. Alternatively, the dispersion of the distances, which are recorded within the transmission period of the transmission information Tx, can be obtained and set as the distance fluctuation data.

The sudden brake frequency data indicates the number of times of the sudden braking within a predetermined period of time (such as 10 minutes).

The relative velocity fluctuation data, the distance fluctuation data, as well as the sudden brake frequency data represents log data related to the control stability of the vehicle. Apart from that data, for example, it is also possible to have log data indicating the frequency of inattentive driving of the driver as detected using the eye tracking technology; or log data indicating the frequency of drowsy driving of the driver as detected using the face image recognition technology.

Meanwhile, the transmission information Tx may also contain information other than the information illustrated in FIG. 3. For example, path information indicating the path of travel of the vehicle as calculated by the vehicle-mounted device 20 in response to a driver operation for setting the destination can be included in the transmission information Tx. For example, the path information can be used by the server device 10 at the time of identifying the destination ITS spot to which the vehicle reception information Rx is transmitted.

Meanwhile, in road-to-vehicle communication or vehicle-to-vehicle communication (called V2X), a fundamental message is designed that should be transmitted by the vehicle-mounted device 20. The fundamental message has the format for storing management information that contains vehicle identification information (the vehicle ID), and for storing fundamental information that contains the timing, the position, the vehicle status, (application of brakes or implementation of the ADAS), and vehicle information (the vehicle type and size information such as the vehicle width). In the case of transmitting the fundamental message of V2X, the vehicle-mounted device 20 can add the regular flag, the device information, and the log data in the fundamental message and treat it as the transmission information Tx. Alternatively, the regular flag, the device information, and the log data can be transmitted to the server device 10 separately from the fundamental message (using a separate path than), and the overall information can be treated as the transmission information Tx.

Figure 4:
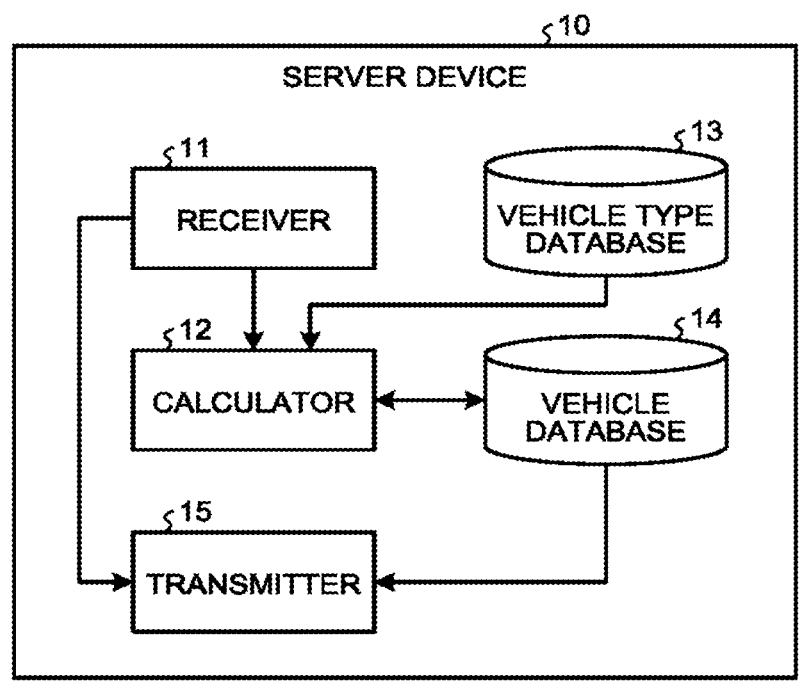
FIG. 4 is a block diagram illustrating an exemplary functional configuration of a server device.

FIG. 4 is a block diagram illustrating an exemplary functional configuration of the server device 10. For example, as illustrated in FIG. 4, the server device 10 includes a receiver 11, a calculator 12, a vehicle type database 13, a vehicle database 14, and a transmitter 15. Firstly, the explanation is given about the vehicle type database 13 and the vehicle database 14.

The vehicle type database 13 is a database to hold, for each vehicle type, the fundamental information of the vehicle-mounted device 20 and the result of a performance evaluation test of the vehicle-mounted device 20 as carried out by a public institution such as NCAP (which stands for New Car Assessment Programme). The fundamental information of the vehicle-mounted device 20 contains, for example, the unaltered configuration (system configuration) of the vehicle-mounted device 20, the model number of each device included in the vehicle-mounted device 20, the OEM name, and performance information such as the braking distance of the vehicle-mounted device 20. Such information can be obtained from, for example, the vendor of the vehicle in which the vehicle-mounted device 20 is mounted. Alternatively, since the result of a performance evaluation test of the vehicle-mounted device 20 as carried out by a public institution is made public on the network 40, the information can be obtained from the network 40. In the embodiment, it is assumed that the fundamental information of the vehicle-mounted device 20 and the result of a performance evaluation test is obtained in advance and is stored in the vehicle type database 13.

Figures 5, 6:
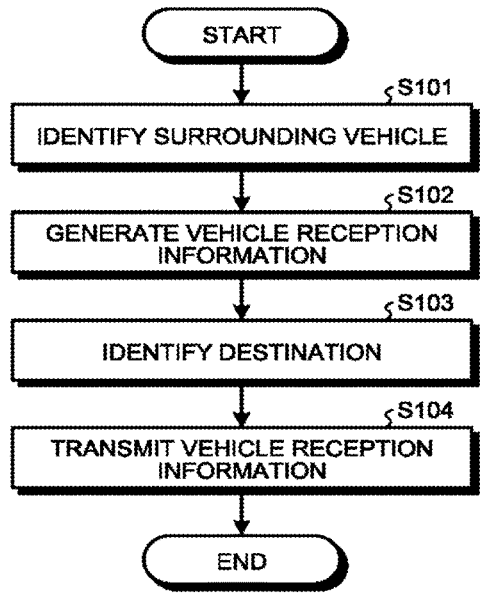
FIG. 5 is a diagram illustrating an exemplary data structure of a vehicle database.
FIG. 6 is a flowchart for explaining an exemplary sequence of operations performed by a transmitter.

The vehicle database 14 is a database to hold, for each vehicle, the information related to the performance of the vehicle along with the degree of reliability and the position information. An exemplary data structure of the vehicle database 14 is illustrated in FIG. 5. For example, as illustrated in FIG. 5, the vehicle database 14 can be built as table data with the vehicle IDs serving as keys. The vehicle database 14 illustrated in FIG. 5 is built as table data having the following columns: a "vehicle ID" column for storing vehicle IDs; a "regular flag" column; "an "OEM name" column; a "recognition LSI" column; a "determination LSI" column; a "control LSI" column; a "degree of reliability" column; and a "position information" column.

The "regular flag" column stores therein the value of the regular flag that is specified in the transmission information Tx transmitted from the vehicle-mounted device 20 of the vehicle that is identified by the vehicle ID.

The "OEM name" column stores therein the OEM name that is obtained by searching the vehicle type database 13 with the vehicle type identified by the vehicle ID serving as the key.

The "recognition LSI" column stores therein the model number of the recognition-type LSI as obtained by searching the vehicle type database 13 with the vehicle type identified by the vehicle ID serving as the key. Meanwhile, if the regular flag specified in the transmission information Tx transmitted from the vehicle-mounted device 20 of the vehicle identified by the vehicle ID has the value "0" (indicating alteration) and if device information indicating the model number of the recognition-type LSI is specified in the transmission information Tx, then the device information specified in the transmission information Tx is stored in the "recognition LSI" column.

The "determination LSI" column stores therein the model number of the determination-type LSI as obtained by searching the vehicle type database 13 with the vehicle type identified by the vehicle ID serving as the key. Meanwhile, if the regular flag specified in the transmission information Tx transmitted from the vehicle-mounted device 20 of the vehicle identified by the vehicle ID has the value "0" (indicating alteration) and if device information indicating the model number of the determination-type LSI is specified in the transmission information Tx, then the device information specified in the transmission information Tx is stored in the "determination LSI" column.

The "control LSI" column stores therein the model number of the control-type LSI as obtained by searching the vehicle type database 13 with the vehicle type identified by the vehicle ID serving as the key. Meanwhile, if the regular flag specified in the transmission information Tx transmitted from the vehicle-mounted device 20 of the vehicle identified by the vehicle ID has the value "0" (indicating alteration) and if device information indicating the model number of the control-type LSI is specified in the transmission information Tx, then the device information specified in the transmission information Tx is stored in the "control LSI" column.

The "degree of reliability" column stores therein the degree of reliability calculated by the calculator 12 based on the transmission information Tx that is transmitted from the vehicle-mounted device 20 of the vehicle identified by the vehicle ID. Every time the calculator 12 calculates the degree of reliability based on the transmission information Tx, the degree of reliability stored in the "degree of reliability" column is updated with the newly-calculated degree of reliability.

The "position information" column stores therein the position information that is specified in the transmission information Tx transmitted from the vehicle-mounted device 20 of the vehicle identified by the vehicle ID. Every time the receiver 11 newly receives the transmission information Tx, the position information stored in the "position information" column is updated with the position information specified in the newly-received transmission information Tx.

Meanwhile, the configuration of the vehicle database 14 explained above is only exemplary, and the data structure and the contents of the data to be held can be appropriately modified. For example, if information related to the performance of the vehicle and information usable in calculating the degree of reliability is available, then that information can also be held along with the data items explained above. Moreover, if the vehicle database 14 is to be used only for the purpose of generating and transmitting the vehicle reception information Rx, then the vehicle database 14 can be configured to hold the vehicle-by-vehicle degree of reliability calculated by the calculator 12 and the position information of the vehicles in association with the vehicle IDs.

Returning to the explanation with reference to FIG. 4, the receiver 11 receives the transmission information Tx that is transmitted from the vehicle-mounted device 20 via the ITS spot 30.

Based on the transmission information Tx received by the receiver 11, the calculator 12 calculates the degree of reliability of the vehicle in which the vehicle-mounted device 20 that transmitted the transmission information Tx is mounted. In the embodiment, the calculator 12 calculates at least one of the degree of reliability (a first degree of reliability) indicating the performance dependent on the configuration of the vehicle-mounted device 20 that is identified based on the vehicle ID specified in the transmission information Tx, or the degree of reliability (a second degree of reliability) indicating the control stability of the vehicle-mounted device 20 based on the log data specified in the transmission information Tx; and stores the degree of reliability in the "degree of reliability" column of the vehicle database 14. Moreover, after a surrounding vehicle is identified with respect to the vehicle to which the vehicle reception information Rx is to be transmitted (i.e., the target vehicle), based on the degree of reliability of the target vehicle and the degree of reliability of the surrounding vehicle as held in the vehicle database 14, the calculator 12 can calculate the degree of reliability (a third degree of reliability) indicating the control stability of the surrounding vehicle of the target vehicle.

Given below is the explanation of specific examples of the methods for calculating the three types of degree of reliability. Firstly, the explanation is given about a specific example of the method for calculating the first degree of reliability. In the case of calculating the first degree of reliability, firstly, the vehicle ID and an regular flag specified in the transmission information Tx are referred to. If the regular flag is set to the value "1" (indicating no alteration), then the vehicle type database 13 is searched with the vehicle ID serving as the key, and the result of a performance evaluation test performed with respect to the vehicle-mounted device 20 that transmitted the transmission Tx is obtained. Then, the result of the performance evaluation test is converted into, for example, a value indicating the percentage where the maximum value of the results of the performance evaluation test of all vehicle types is set to 100; and the obtained value is set as the first degree of reliability of the vehicle in which the vehicle-mounted device 20 is mounted. If the regular flag is set to the value "0" (indicating alteration), then either the first degree of reliability may not be calculated; or, for example, the first degree of reliability can be calculated by correcting the value, which is obtained from the result of the performance evaluation test of the vehicle-mounted device in an identical manner to the case in which the alteration flag is set to the value "1" (indicating no alteration), using a correction coefficient set in advance according to the device information specified in the transmission information Tx.

Meanwhile, regarding the vehicle-mounted device 20 of a single vehicle type, if a plurality of results of the performance evaluation test according to the division of the time slot is held in the vehicle type database 13, then it is desirable that the result of the performance evaluation test corresponding to the timing of receiving the transmission information Tx is obtained from the vehicle type database 13 and the first degree of reliability is calculated based on the obtained result. Moreover, regarding the vehicle-mounted device 20 of a single vehicle type, if a plurality of results of the performance evaluation test according to the division of the weather or the road surface condition is held in the vehicle type database 13, then it is desirable that the information about the weather and the road surface condition at the current position of the vehicle is separately obtained, the result of the performance evaluation test corresponding to the weather and the road surface condition at the current position of the vehicle is obtained from the vehicle type database 13, and the first degree of reliability is calculated based on the obtained information.

Meanwhile, the first degree of reliability calculated in the manner described above can be corrected according to, for example, the device setting information specified in the transmission information Tx. For example, it is possible to think that, when the setting of a predetermined function is switched OFF, the first degree of reliability can be corrected to a lower value.

The following explanation is given about a specific example of the method for calculating the second degree of reliability. The second degree of reliability is calculated based on the log data specified in the transmission information Tx. When the log data represents the relative velocity fluctuation data, stability seeds are decided according to the amount of variation in the relative velocity. For example, when the amount of variation in the relative velocity is 0 km/h to 5 km/h, a stability seed 100 is decided. When the amount of variation in the relative velocity is 5 km/h to 10 km/h, a stability seed 90 is decided. When the amount of variation in the relative velocity is 10 km/h to 15 km/h, a stability seed 80 is decided. Then, for example, the average value of stability seeds corresponding to the relative velocity fluctuation data in the recent three minutes is calculated and set as the second degree of reliability. Alternatively, in addition to calculating the average value of stability seeds corresponding to the relative velocity fluctuation data in the recent three minutes, the average value of stability seeds corresponding to the relative velocity fluctuation data during the entire activation period of the vehicle-mounted device 20 can be calculated, and the second degree of reliability can be calculated based on those average values.

When the log data represents the distance fluctuation data, stability seeds are decided according to the amount of variation in the distance. For example, when the amount of variation in the distance from another vehicle is 0 m to 1 m (or when the amount of variation in the distance from a lane mark is 0 cm to 10 cm), the stability seed 100 is decided. When the amount of variation in the distance from another vehicle is 1 m to 2 m (or when the amount of variation in the distance from a lane mark is 10 cm to 20 cm), the stability seed 90 is decided. When the amount of variation in the distance from another vehicle is 2 m to 3 m (or when the amount of variation in the distance from a lane mark is 20 cm to 30 cm), the stability seed 80 is decided. Then, for example, the average value of stability seeds corresponding to the distance fluctuation data in the recent three minutes is calculated and set as the second degree of reliability. Alternatively, in addition to calculating the average value of stability seeds corresponding to the distance fluctuation data in the recent three minutes, the average value of stability seeds corresponding to the distance fluctuation data during the entire activation period of the vehicle-mounted device 20 can be calculated, and the second degree of reliability can be calculated based on those average values.

When the log data represents the sudden brake frequency data, lower the sudden brake count, the higher is the calculated second degree of reliability. For example, if the sudden brake count within a predetermined period of time is 0, then the second degree of reliability is calculated to be 100. If the sudden brake count within a predetermined period of time is 1, then the second degree of reliability is calculated to be 90. If the sudden brake count within a predetermined period of time is 2, then the second degree of reliability is calculated to be 90.

Meanwhile, if the transmission information Tx contains a plurality of types of log data, either the second degree of reliability can be calculated using one of the types of log data, or the second degree of reliability can be calculated using a plurality of types of log data in a combined manner such as by taking the average value of the second degrees of reliability calculated using all types of log data.

The following explanation is given about a specific example of the method for calculating the third degree of reliability. After a surrounding vehicle is identified with respect to the target vehicle to which the vehicle reception information Rx is to be transmitted, the third degree of reliability is calculated based on the degree of reliability of the target vehicle (the first degree of reliability or the second degree of reliability) and the degree of reliability of the surrounding vehicle (the first degree of reliability or the second degree of reliability) as held in the vehicle database 14. The third degree of reliability indicates the control stability of the surrounding vehicle of the target vehicle. When a plurality of surrounding vehicles is identified, the third-degree of reliability is calculated for each surrounding vehicle.

For example, the degree of reliability of the target vehicle is compared with the degree of reliability of the surrounding vehicle and, if the degree of reliability of the surrounding vehicle is greater than the degree of reliability of the target vehicle, then the third degree of reliability of the surrounding vehicle is set to 100. On the other hand, if the degree of reliability of the surrounding vehicle is smaller than the degree of reliability of the target vehicle, then the value obtained by subtracting the difference between the degree of reliability of the target vehicle and the degree of reliability of the surrounding vehicle from 100 is set as the third degree of reliability of the surrounding vehicle. However, the method for calculating the third degree of reliability is not limited to this method. That is, as long as the third degree of reliability is a value representing the control stability of the surrounding vehicle of the target vehicle, it serves the purpose.

Meanwhile, the first degree of reliability, the second degree of reliability, and the third degree of reliability are examples of the degree of reliability calculated by the calculator 12. The degree of reliability calculated by the calculator 12 is calculated based on the transmission information Tx. As long as the degree of reliability is a value indicating the vehicle performance or the control stability, it is not limited to the examples explained above.

The transmitter 15 refers to the vehicle database 14 so as to identify a surrounding vehicle of the target vehicle satisfying predetermined conditions (for example, the vehicle that transmitted the transmission information Tx received by the receiver 11), and transmits, to the vehicle-mounted device 20 of the target vehicle, the vehicle reception information Rx containing the degree of reliability calculated for the surrounding vehicle.

FIG. 6 is a flowchart for explaining an exemplary sequence of operations performed by the transmitter 15. With reference to the flowchart illustrated in FIG. 6, a specific example of the operations performed by the transmitter 15 is explained. The sequence of operations illustrated in the flowchart in FIG. 6 is repeated for each target vehicle.

Firstly, the transmitter 15 refers to the vehicle database 14 and, from the relationship between the position information of the target vehicle and the position information of other vehicles, identifies a surrounding vehicle running in the vicinity of the target vehicle (Step S101). Then, the transmitter 15 generates the vehicle reception information Rx containing the degree of reliability of the surrounding vehicle that is identified at Step S101 (Step S102).

Figure 7:
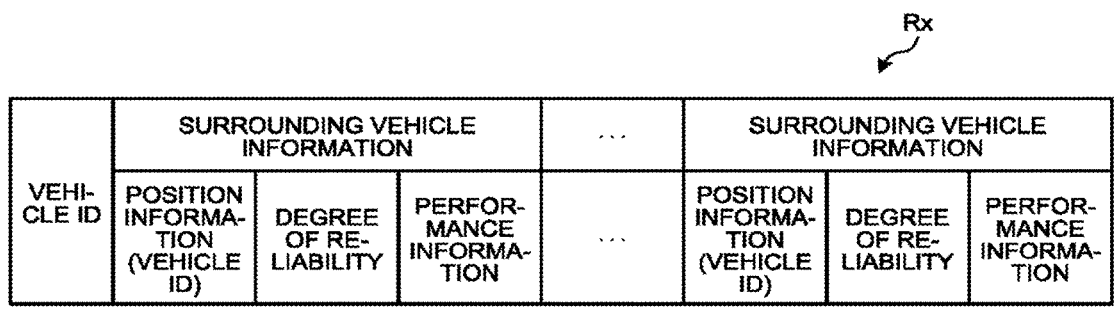
FIG. 7 is a diagram illustrating an example of vehicle reception information.

FIG. 7 is a diagram illustrating an example of the vehicle reception information Rx generated by the transmitter 15. For example, as illustrated in FIG. 7, the vehicle reception information Rx contains the vehicle ID of the target vehicle and contains the surrounding vehicle information of each surrounding vehicle. The surrounding vehicle information contains the position information of the surrounding vehicle (the vehicle ID of the surrounding vehicle can also be added) and contains the degree of reliability and the performance information (the braking distance) of the surrounding vehicle. In the example illustrated in FIG. 7, in order to be able to display the braking distance of each surrounding vehicle in response to a predetermined operation of the driver of the target vehicle, the performance information is included in the surrounding vehicle information. However, that is not mandatory.

For example, the transmitter 15 obtains the position information (and the vehicle ID) of the surrounding vehicle, which is identified at Step S101, and the degree of reliability from the vehicle database 14; obtains the performance information of the surrounding vehicle from the vehicle type database 13; and generates the surrounding vehicle information. Regarding the degree of reliability of the surrounding vehicle, if the first degree of reliability as well as the second degree of reliability is held in the vehicle database 14, then either the surrounding vehicle information containing the first degree of reliability as well as the second degree of reliability can be generated or the surrounding vehicle information containing either the first degree of reliability or the second degree of reliability can be generated. Moreover, in the case of generating the surrounding vehicle information containing the third degree of reliability, the calculator 12 is requested to calculate the third degree of reliability of the surrounding vehicle identified at Step S101, and the surrounding vehicle information is generated after obtaining the third degree of reliability calculated by the calculator 12 in response to the request. Then, the transmitter 15 couples the generated pieces of surrounding vehicle information, attaches the vehicle ID of the target vehicle thereto, so as to generate the vehicle reception information Rx illustrated in FIG. 7.

Subsequently, based on the position information of the target vehicle, the transmitter 15 identifies the destination of the vehicle reception information Rx generated at Step S102 (Step S103). In the embodiment, since the vehicle reception information Rx is transmitted in a receivable manner for the vehicle-mounted device 20 of the target vehicle via the ITS spot 30, the transmitter 15 identifies the ITS spot 30 serving as the destination of the vehicle reception information Rx. At that time, if the path information of the target vehicle is included in the transmission information Tx that is transmitted from the target vehicle and received by the receiver 11, the transmitter 15 identifies the ITS spot 30 serving as the destination of the vehicle reception information Rx based on the position information and the path information of the target vehicle. Then, the transmitter 15 transmits the vehicle reception information Rx, which is generated at Step S102, to the destination identified at Step S103 (Step S104). In this manner, the operations performed with respect to a single target vehicle are completed.

The vehicle reception information Rx, which is transmitted from the transmitter 15 of the server device 10 to the ITS spot 30, is then received by the vehicle-mounted device 20 of the target vehicle as a result of two-way communication between the ITS spot 30 and the vehicle-mounted device 20. Thus, for example, based on the vehicle ID specified in the vehicle reception information Rx, the vehicle-mounted device 20 can identify the vehicle reception information Rx that should be received.

Upon receiving the vehicle reception information Rx that is transmitted from the server device 10 via the ITS spot 30, the vehicle-mounted device 20 performs predetermined operations based on the degree of reliability of each surrounding vehicle as specified in the vehicle reception information Rx. For example, the display device 50 of the vehicle-mounted device 20 displays a driving support screen with the aim of supporting the driving of the driver of the vehicle according to the degrees of reliability of the surrounding vehicles.

Figure 8:
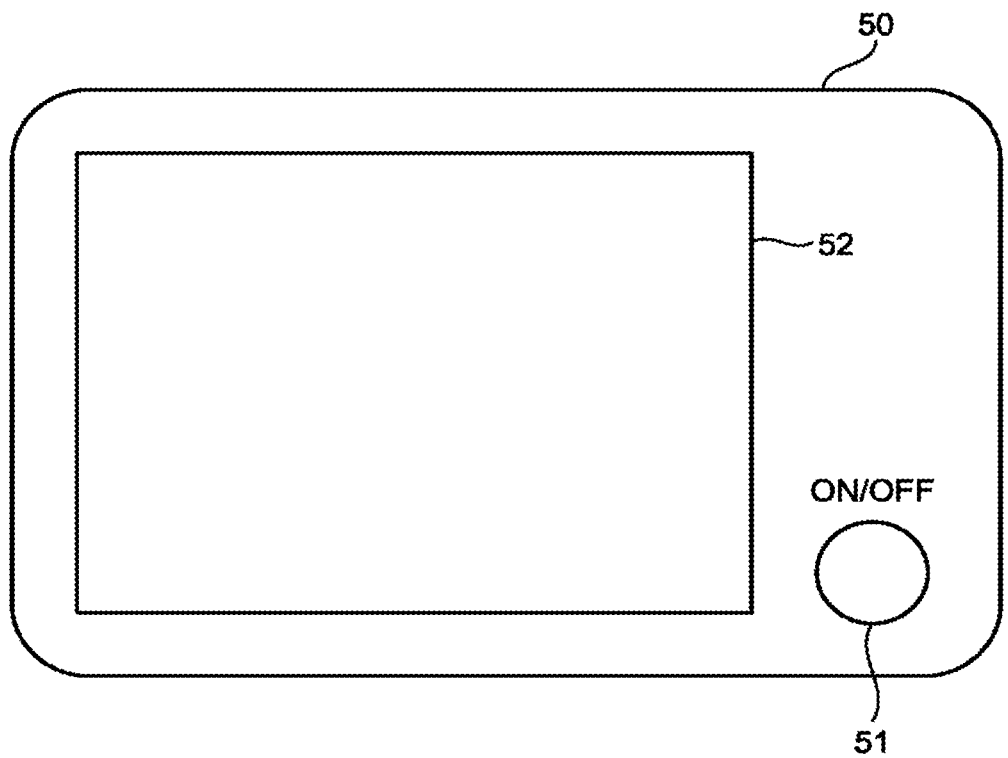
FIG. 8 is a diagram illustrating an exemplary external appearance of a display device.

FIG. 8 is a diagram illustrating an exemplary external appearance of the display device 50 of the mounted-vehicle device 20. For example, as illustrated in FIG. 8, the display device 50 includes an ON/OFF button 51 for communication control and includes a display panel 52. As described above, the ON/OFF button 51 is operated by the driver for the purpose of switching between whether or not to transmit the transmission information Tx and whether or not to receive the vehicle reception information Rx. When the communication control is switched ON by operating the ON/OFF button 51, the driving support screen gets displayed on the display panel 52. Meanwhile, the ON/OFF button 51 for communication control can be disposed at a different position on the display device 50.

Figure 9:
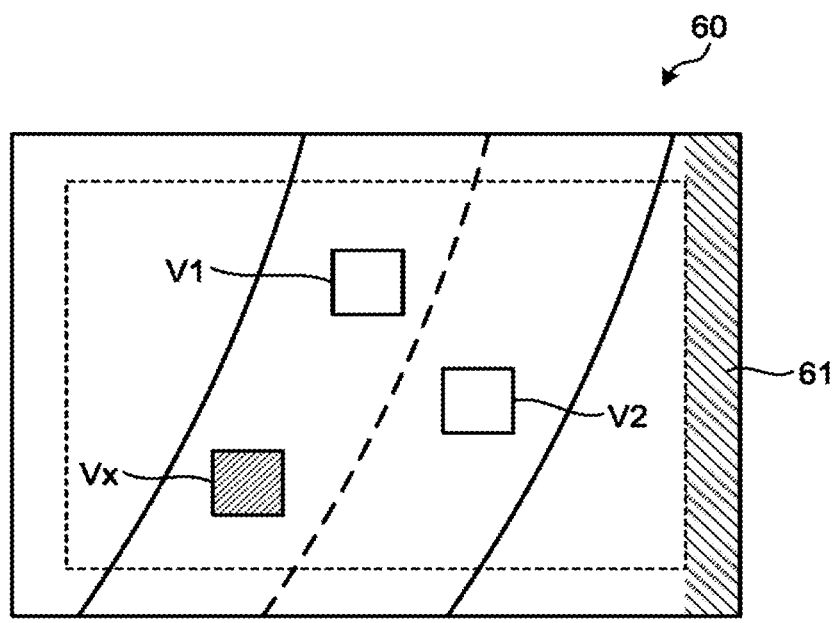
FIG. 9 is a diagram illustrating an example of a driving support screen.

FIG. 9 is a diagram illustrating an example of a driving support screen 60 that is displayed on the display panel 52 of the display device 50. For example, as illustrated in FIG. 9, the screen is configured by superimposing, on the map of the neighboring area of the concerned vehicle, a vehicle icon Vx representing the concerned vehicle and vehicle icons V1 and V2 representing surrounding vehicles. Then, the display formats of the vehicle icons V1 and V2, which represent the surrounding vehicles, change according to the degrees of reliability of the respective surrounding vehicles. For example, the vehicle icons V1 and V2 that are color-coded according to the degrees of reliability of the surrounding vehicles can be superimposed on the map. Moreover, the vehicle icons V1 and V2 that correspond to the surrounding vehicles having the degrees of reliability equal to or smaller than a reference value can be displayed in a blinking manner.

Meanwhile, although the vehicle icons V1 and V2 representing the surrounding vehicles are superimposed at those positions on the map which correspond to the current positions of the surrounding vehicles, the position information of the surrounding vehicles specified in the vehicle reception information Rx is believed to have a large error with respect to the current positions of the surrounding vehicles. In such a case, for example, if the concerned vehicle-mounted device 20 performs vehicle-to-vehicle communication with the vehicle-mounted devices 20 of the surrounding vehicles using the vehicle IDs of the surrounding vehicles specified in the vehicle reception information Rx, the current positions of the surrounding vehicles can be obtained in real time and can be reflected in the driving support screen 60 displayed on the display device 50.

Meanwhile, in the driving support screen 60, for example, a warning frame 61 is provided at a periphery of the screen. When a surrounding vehicle having the degree of reliability equal to or smaller than a reference value is present in the vicinity of the concerned vehicle, the warning frame 61 is used to issue a warning to the driver of the concerned vehicle in such a way that the driver of the concerned vehicle intuitively understands the relative position of that surrounding vehicle with respect to the concerned vehicle. For example, in the driving support screen 60 illustrated in FIG. 9, since a surrounding vehicle having the degree of reliability equal to or smaller than the reference value is present on the right-hand side in the direction of travel of the concerned vehicle, the warning frame 61 on the right-hand side of the periphery of the driving support screen 60 becomes luminescent in an easy-to-recognize color (such as red) for the driver. If a surrounding vehicle having the degree of reliability equal to or smaller than the reference value is present in the vicinity of the concerned vehicle, the warning frame 61 enables the driver of the concerned vehicle to understand the rough position of the surrounding vehicle to watch out for, and then the driver can refer to the driving support screen 60 to understand the detailed situation.

Meanwhile, if the vehicle reception information Rx contains the first degree of reliability as well as the second degree of reliability, the display format of the vehicle icons V1 and V2 representing the surrounding vehicles and whether or not it is necessary to issue a warning using the warning frame 61 can be decided using, for example, the degree of reliability selected according to the settings done by the driver of the concerned vehicle. Moreover, for example, if a predetermined operation such as touching the vehicle icons V1 and V2 representing the surrounding vehicles is performed; then it is possible to perform display control in which the performance information such as the braking distances of those surrounding vehicles pops up on the driving support screen 60.

In the vehicle-mounted device 20, using the degrees of reliability of the surrounding vehicles as specified in the vehicle reception information Rx, not only the display device 50 displays the driving support screen 60 as described earlier, but also the determining unit 22 performs determination by taking into account the degrees of reliability of the surrounding vehicles and then the control unit 23 performs control according to the determination result so as to control the behavior of the concerned vehicle. For example, when a surrounding vehicle having the degree of reliability equal to or smaller than the reference value is present in the vicinity of the concerned vehicle, the velocity of the concerned vehicle is controlled in the form of deceleration so that it becomes easier to perform control for avoiding that surrounding vehicle or, if that surrounding vehicle is running at a slow velocity, the velocity of the concerned vehicle is controlled in the form of acceleration within the velocity limit so as to move away from the surrounding vehicle.

Meanwhile, according to the degrees of reliability, the vehicle-mounted device 20 can be configured to change the priority of the sensing performed by the recognizing unit 21. For example, when a surrounding vehicle having a low degree of reliability is present on the right-hand side in the direction of travel of the concerned vehicle, the recognizing unit 21 can be configured to perform sensing of the right-hand side of the concerned vehicle with priority.

As explained above in detail with reference to specific examples, in the server device 10 according to the embodiment, the degree of reliability of the vehicle is calculated based on the transmission information Tx transmitted from the vehicle-mounted device 20 and is held in the vehicle database 14. Then, to the target vehicle that has transmitted the transmission information Tx, the vehicle reception information Rx containing the degrees of reliability of the surrounding vehicles is transmitted. Thus, as a result of using the server device 10 according to the embodiment, it becomes possible to build a mechanism for reflecting the degrees of reliability in the vehicle control.

Moreover, the vehicle-mounted device 20 according to the embodiment receives the vehicle reception information Rx containing the degrees of reliability of the surrounding vehicles and, according to the degrees of reliability of the surrounding vehicles, displays the driving support screen 60 using the display device 50 and controls the behavior of the vehicle. Thus, using the vehicle-mounted device 20 according to the embodiment, it becomes possible to achieve safer running of the vehicle.

The server device 10 according to the embodiment can be implemented using, for example, cooperation between hardware constituting a general-purpose computer and computer programs (software) executed in the computer. For example, when the computer executes a predetermined computer program; the receiver 11, the calculator 12, and the transmitter 15 can be implemented. Moreover, using a high-capacity memory device installed in the computer, the vehicle type database 13 and the vehicle database 14 can be implemented.

Figure 10:
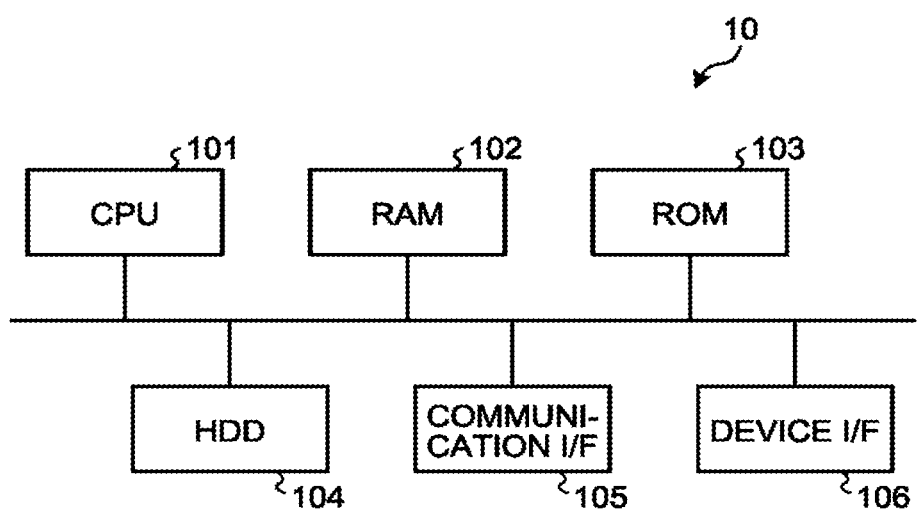
FIG. 10 is a block diagram illustrating an exemplary hardware configuration of the server device.

FIG. 10 is a block diagram illustrating an exemplary hardware configuration of the server device 10 according to the embodiment. For example, as illustrated in FIG. 10, the server device 10 has a hardware configuration of a general-purpose computer including a hardware processor such as a central processing unit (CPU) 101, memory devices such as a random access memory (RAM) 102 and a read only memory (ROM) 103, a high-capacity memory device such as a hard disk drive (HDD) 104, a communication interface (I/F) 105 that performs communication with outside via the network 40, and a device I/F 106 for establishing connection with peripheral devices.

The computer program is recorded in, for example, a magnetic disk, an optical disk, a semiconductor memory, or a similar type of recording medium. As long as the recording medium in which the computer program is recorded is a recording medium readable by a computer system, the computer program can be recorded in any arbitrary memory format. Alternatively, the computer program can be installed in advance in the computer, or can be distributed over a network and then installed in the computer.

The computer program executed in the computer contains modules of the functional constituent elements such as the receiver 11, the calculator 12, and the transmitter 15. When the processor reads the computer program and executes it, the constituent elements are generated in a main memory such as the RAM 102.

Meanwhile, alternatively, some or all of the functional constituent elements of the server device 10 according to the embodiment can be configured using dedicated hardware such as an application specific integrated circuit (ASIC) or a field-programmable gate array (FPGA).

Still alternatively, the server device 10 according to the embodiment can be configured as a network system in which a plurality of computers is communicably connected to each other, and the constituent elements can be implemented in a dispersed manner among the computers.

While a certain embodiment have been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device that is communicably connected to a vehicle-mounted device, the information processing device comprising:
a receiver, implemented in computer hardware, configured to receive transmission information which is transmitted from the vehicle-mounted device and contains at least vehicle identification information, vehicle position information, a flag for indicating presence or absence of alternation of the vehicle-mounted device, and predetermined log data recorded by the vehicle-mounted device;
a calculator, implemented in computer hardware, configured to, based on the received transmission information, calculate a degree of reliability of the vehicle in which the vehicle-mounted device is mounted;
a vehicle database configured to hold, for each vehicle, at least the calculated degree of reliability and the vehicle position information; and
a transmitter, implemented in computer hardware, configured to
refer to the vehicle database to identify a surrounding vehicle of a target vehicle which satisfies a predetermined condition, and
transmit, to the vehicle-mounted device of the target vehicle, vehicle reception information containing the degree of reliability calculated for the surrounding vehicle.

2. The device according to claim 1, wherein
the calculator calculates a first degree of reliability that indicates performance dependent on configuration of the vehicle-mounted device identified based on the vehicle identification information, and
the transmitter transmits, to the vehicle-mounted device of the target vehicle, the vehicle reception information which contains the first degree of reliability calculated for the surrounding vehicle.

3. The device according to claim 1, wherein
the calculator calculates, based on the log data, a second degree of reliability that indicates stability of control performed by the vehicle-mounted device, and
the transmitter transmits, to the vehicle-mounted device of the target vehicle, the vehicle reception information which contains the second degree of reliability calculated for the surrounding vehicle.

4. The device according to claim 1, wherein
after the surrounding vehicle of the target vehicle is identified, the calculator calculates, based on the degree of reliability calculated for the target vehicle and the degree of reliability calculated for the surrounding vehicle, a third degree of reliability that indicates stability of control of the surrounding vehicle of the target vehicle, and
the transmitter transmits, to the vehicle-mounted device of the target vehicle, the vehicle reception information which contains the third degree of reliability calculated for the surrounding vehicle.

5. The device according to claim 1, wherein the log data contains at least one of relative velocity fluctuation data indicating time variation in relative velocity with respect to another vehicle, distance fluctuation data indicating time variation of distance from another vehicle or a lane mark, and sudden brake frequency data indicating the number of times of sudden braking within a predetermined period of time.

6. The device according to claim 1, wherein, when the flag indicates that the vehicle-mounted device has been altered, the transmission information further contains device information that enables identification of the type of a device modified due to alteration.

7. The device according to claim 1, wherein the transmission information further contains device setting information indicating an ON/OFF state of each function of the vehicle-mounted device.

8. The device according to claim 1, wherein
the transmission information further contains path information indicating a path of travel of the vehicle in which the vehicle-mounted device is mounted, and
based on the vehicle position information and the path information of the target vehicle, the transmitter identifies a destination of the vehicle reception information.

9. A vehicle-mounted device that is communicably connected to an information processing device, the vehicle-mounted device comprising:
a transmitter, implemented in computer hardware, configured to transmit, to the information processing device, transmission information which contains at least vehicle identification information, vehicle position information, a flag for indicating presence or absence of alternation of the vehicle-mounted device, and predetermined log data recorded by the vehicle-mounted device; and
a receiver, implemented in computer hardware, configured to receive vehicle reception information containing a degree of reliability of a surrounding vehicle as calculated by the information processing device, wherein
the vehicle-mounted device performs a predetermined operation based on the degree of reliability of the surrounding vehicle.

10. The device according to claim 9, further comprising a display device configured to display a screen in which a vehicle icon representing the surrounding vehicle is superimposed on a map, wherein
based on the degree of reliability of the surrounding vehicle, the display device varies a display format of the vehicle icon in the screen.

11. The device according to claim 10, wherein, when the received degree of reliability of the surrounding vehicle is equal to or smaller than a reference value, the display device displays the screen including a warning according to a relative position of the surrounding vehicle with respect to the vehicle in which the vehicle-mounted device is mounted.

12. The device according to claim 9, further comprising a vehicle controller, implemented in computer hardware, configured to control behavior of the vehicle in which the vehicle-mounted device is mounted, based on the received degree of reliability of the surrounding vehicle.

13. The device according to claim 12, wherein, when the received degree of reliability of the surrounding vehicle is equal to or smaller than a reference value, the vehicle controller controls the velocity velocity of the vehicle.

14. An information processing method implemented in an information processing device that is communicably connected to a vehicle-mounted device, the method comprising:
receiving transmission information which is transmitted from the vehicle-mounted device and contains at least vehicle identification information, vehicle position information, a flag for indicating presence or absence of alternation of the vehicle-mounted device, and predetermined log data recorded by the vehicle-mounted device;
calculating, based on the received transmission information, a degree of reliability of the vehicle in which the vehicle-mounted device is mounted;
holding, for each vehicle, at least the calculated degree of reliability and the vehicle position information in a vehicle database;
referring to the vehicle database to identify a surrounding vehicle of a target vehicle which satisfies a predetermined condition;
transmitting, to the vehicle-mounted device of the target vehicle, vehicle reception information containing the degree of reliability calculated for the surrounding vehicle.

15. An information processing method implemented in a vehicle-mounted device that is communicably connected to an information processing device, the method comprising:
transmitting, to the information processing device, transmission information which contains at least vehicle identification information, vehicle position information, a flag for indicating presence or absence of alternation of the vehicle-mounted device, and predetermined log data recorded by the vehicle-mounted device;
receiving vehicle reception information containing a degree of reliability of a surrounding vehicle as calculated by the information processing device; and
performing a predetermined operation based on the degree of reliability of the surrounding vehicle.

* * * * *